US008024775B2

(12) United States Patent
Xu et al.

(10) Patent No.: US 8,024,775 B2
(45) Date of Patent: Sep. 20, 2011

(54) SKETCH-BASED PASSWORD AUTHENTICATION

(75) Inventors: Ying-Qing Xu, Beijing (CN); Fang Wen, Beijing (CN); Mizuki Oka, Tsukuba (JP)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 12/034,254

(22) Filed: Feb. 20, 2008

(65) Prior Publication Data

US 2009/0210939 A1    Aug. 20, 2009

(51) Int. Cl.
*G06F 7/04* (2006.01)

(52) U.S. Cl. ............... 726/2; 726/16; 726/17; 726/18; 726/20; 726/21; 713/182; 713/183; 713/184; 713/185; 713/186

(58) Field of Classification Search ............... 726/16, 726/21, 2, 17–20; 713/182–186
See application file for complete search history.

(56) References Cited

U.S. PATENT DOCUMENTS

| | | | | |
|---|---|---|---|---|
| 5,224,179 A * | 6/1993 | Denker et al. | | 382/259 |
| 5,485,531 A * | 1/1996 | Ichinohe et al. | | 382/198 |
| 5,539,840 A * | 7/1996 | Krtolica et al. | | 382/195 |
| 5,559,961 A | 9/1996 | Blonder | | |
| 7,240,367 B2 | 7/2007 | Park | | |
| 7,257,241 B2 * | 8/2007 | Lo | | 382/124 |
| 7,279,646 B2 | 10/2007 | Xu | | |
| 7,734,930 B2 * | 6/2010 | Kirovski et al. | | 713/184 |
| 2003/0128396 A1 | 7/2003 | Fan | | |
| 2004/0034801 A1 | 2/2004 | Jaeger | | |
| 2004/0169638 A1 | 9/2004 | Kaplan | | |
| 2004/0230843 A1 | 11/2004 | Jansen | | |
| 2004/0260955 A1 | 12/2004 | Mantyla | | |
| 2006/0174339 A1 | 8/2006 | Tao | | |
| 2006/0206918 A1 | 9/2006 | McLean | | |
| 2007/0047772 A1 * | 3/2007 | Matey et al. | | 382/117 |
| 2007/0071285 A1 * | 3/2007 | Kontsevich | | 382/103 |
| 2009/0138725 A1 * | 5/2009 | Madhvanath et al. | | 713/186 |
| 2010/0223276 A1 * | 9/2010 | Al-Shameri et al. | | 707/769 |

FOREIGN PATENT DOCUMENTS

WO    WO0177792    10/2001

OTHER PUBLICATIONS

Ballard, Generalizing the tough transform to detect arbitrary shapes, Pattern Recognition, V13, No. 2, pp. 11-122, 1981.*
Oka et al., Scribble-a-secret: similarity-based password authentication using sketckes, IEEE, 2008.*
De Angeli, et al., "Is a Picture Really Worth a Thousand Words? Exploring the Feasibility of Graphical Authentication systems," International. Journal of Human—Computer Studies, 63, 2005, pp. 128-152.

(Continued)

*Primary Examiner* — Nabil El Hady
(74) *Attorney, Agent, or Firm* — Lee & Hayes, PLLC

(57) ABSTRACT

A graphical password authentication method is based on sketches drawn by user. The method extracts a template edge orientation pattern from an initial sketch of the user and an input edge orientation pattern from an input sketch of the user, compares the similarity between the two edge orientation patterns, and makes an authentication decision based on the similarity. The edge orientations are quantized, and each edge orientation pattern includes a set of quantized orientation patterns each corresponding to one of the quantized edge orientations. The number of quantized edge orientations, as well as other parameters such as the dimension of the final orientation patterns and acceptance threshold, can be optimized either globally or user-specifically.

16 Claims, 6 Drawing Sheets

OTHER PUBLICATIONS

Dirik et al., "Modeling User Choice in the PassPoints Graphical Password Scheme," ACM, Symposium on Usable Privacy and Security (SOUPS), Jul. 2007, pp. 20-28.

Jermyn, et al., "The Design and Analysis of Graphical Passwords," In SSYM'99: Proceedings of the 8th Conf. on USENIX Security Symposium, 1999, 20 pages.

Kara, et al., "Hierarchical Parsing and Recognition of Hand-Sketched Diagrams," In UIST '04: Proceedings of the 17th Annual ACM Symposium on User Interface Software and Technology, 2004, 10 pages.

Nali, et al., "Analyzing User Choice in Graphical Passwords", found at <<http://www.scs.carleton.ca/research/tech_reports/2004/TR-04-01.pdf>>, May 27, 2004, Technical Report, School of Information Technology an Engineering, Univ of Ottawa, Canada, 6 pgs.

Oka, "A New Cellular Automaton Structure for Macroscopic Linear-Curved Features Extraction," Proceedings of the 4th International Joint Conference on Pattern Recognition, Kyoto, Japan, 1978, pp. 654-656.

Suo, et al., "Graphical Passwords: A Survey," found at <<http://www.acsa-admin.org/2005/papers/89.pdf>>, 21st Annual Computer Security Applications Conf (ACSA05), 2005, 10 pgs.

Wiedenbeck, et al., "Authentication Using Graphical Passwords: Effects of Tolerance and Image Choice", found at <<http://www.gbtn.org/~chlee/research/phishing/p1-wiedenbeck.pdf>>, Symposium on Usable Privacy and Security (SOUPS), Jul. 2005, 12 pgs.

Chalkias, et al., "Multi-Grid Graphical Password Scheme", Proceedings of the 6th International Conference on Artificial Intelligence and Digital Communications (AIDC), 2006.

PCT International Search Report dated Aug. 27, 2009 for corresponding PCT Application No. PCT/US2009/032771 filed Jan. 31, 2009, 3 pages.

"Drawing Passwords", IBM Technical Disclosure Bulletin, International Business Machines Corp., US, May 1, 1997 vol. 40, No. 5, pp. 201-203.

The Extended European Search Report mailed Jun. 9, 2011 for European Patent Application No. EP09711593, 8 pages.

Govindarajulu, et al., "Password Management Using Doodles", ICMI 2007 Proceedings of the 9th International Conference on Multimodal Interfaces, Nov. 15, 2007, pp. 236-239.

Varenhorst, "Passdoodles: a Lightweight Authentication Method", retrieved from the internet on May 25, 2011 at <<http://people.csail.mit.edu/emax/papers/varenhorst.pdf>>, May 15, 2005, 14 pages.

* cited by examiner

SKETCH-BASED PASSWORD AUTHENTICATION

BACKGROUND

Traditional knowledge-based authentication mechanisms, such as Personal Identification Numbers (PINs) and text-based passwords, have a known weakness. While the security can be enhanced by creating a longer password, the password becomes more difficult to remember. Studies have shown that users as a result tend to pick shorter and more predictable passwords.

To address this problem in traditional knowledge-based authentication, graphical password schemes have been proposed. A range of different mechanisms have been suggested to exploit the power of graphical password authentication. The study of graphical passwords is strongly motivated by the assumption that images and/or pictures are easier to recall for humans than traditional text-based passwords. This assumption is supported by several cognitive psychology studies. The studies explore human visual memory space and show that pictures tend to be remembered far better and for longer than words. This is called the picture superiority effect. Researchers have conducted user studies on retention of pictures in graphical passwords and showed that this effect also holds true for graphical passwords even when multiple passwords are to be remembered.

Graphical passwords can be clustered into three categories: "cognometric", "locimetric", and "drawmetric". The cognometric systems are based on the user's visual recognition of target images embedded amongst a set of distracter images. A user is asked to select a sequence of images from a larger set of images. Later, the user is required to identify the pre-selected images in order to be authenticated. The use of artist-drawn images, computer-generated abstract images and photographs has been explored in this approach. The photographs have been found the most effective for memory. The major drawback of cognometric systems is that it takes longer to create a password and longer to login than text-based passwords.

The locimetric systems are based on the method of loci (mnemonic) and cued recall. In this scheme, a user is requested to click on pre-selected areas of an image in a predefined order. This approach is considered more convenient than pure recall-based passwords. However, user studies showed that there is a tendency for the password to be predictable with obvious points in the picture being chosen. Moreover, users have weak tolerance for clicking accurate points on the image. It also takes longer for users to learn the password and to input their passwords than the text-based password.

The drawmetric systems require users to draw a figure on a canvas. A well-known system in this category is "Draw-a-Secret (DAS)", in which a user is asked to draw a simple picture on a 2D grid. The positions of the grids and the order of the strokes are stored for later comparison. If the user's drawing touches the same grids in the same order, the user is authenticated. However, the approach has not been met with success. The user study show that users may be able to remember how their drawings looked, but they tend to be unable to recreate it accurately in the correct grids, or with the correct sequence of strokes.

It is thus desirable to explore new authentication schemes to take fuller advantage of graphical password authentication schemes without suffering too many of the existing shortcomings.

SUMMARY

In this disclosure, a sketch-based graphical password authentication technique is disclosed. The technique may be implemented on a computing device, such as a PC or a portable electronic device, for authenticating user logon. The authentication method is based on sketches drawn by user. The method extracts a template edge orientation pattern from an initial sketch of the user and an input edge orientation pattern from an input sketch of the user, compares the similarity between the two edge orientation patterns, and makes an authentication decision based on the similarity. The edge orientations are quantized, and each edge orientation pattern includes a set of quantized orientation patterns each corresponding to one of the quantized edge orientations. The number of quantized edge orientations, as well as other parameters such as the dimension of the final orientation patterns and acceptance threshold, can be optimized either globally or user-specifically.

In one embodiment, each quantized orientation pattern has a scalar pattern of one of R quantized orientations, where $R \geq 2$ is an integer. Each pixel of a quantized orientation pattern has an amplitude value and is associated with one of the R quantized orientations. R may be optimized for a balance between minimizing false acceptance rate and minimizing false rejection rate of authentication.

To extract the input edge orientation pattern or the template edge orientation pattern, one embodiment of the method first obtains a preliminary orientation pattern of a first dimension (e.g., M×M), reduces the preliminary orientation pattern from the first dimension to a second dimension (e.g., N×N, where N<M) to obtain a reduced orientation pattern, and then computes the input edge orientation pattern from the reduced orientation pattern. The second dimension may be optimized for an optimal balance between minimizing false acceptance rate and minimizing false rejection rate of authentication.

To extract the input edge orientation pattern, one embodiment of the authentication method first computes a gradient orientation of image intensity in the input sketch, quantizes the gradient orientation to rth orientation out of R number of quantized orientations, where $r=1, 2, \ldots, R$, and then computes the input edge orientation pattern from the quantized gradient orientation.

The template edge orientation pattern may be extracted from multiple sketches entered by the user to achieve a more robust authentication result. In one example, the template edge orientation may be updated using the input sketch of the user entered after the initial sketch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
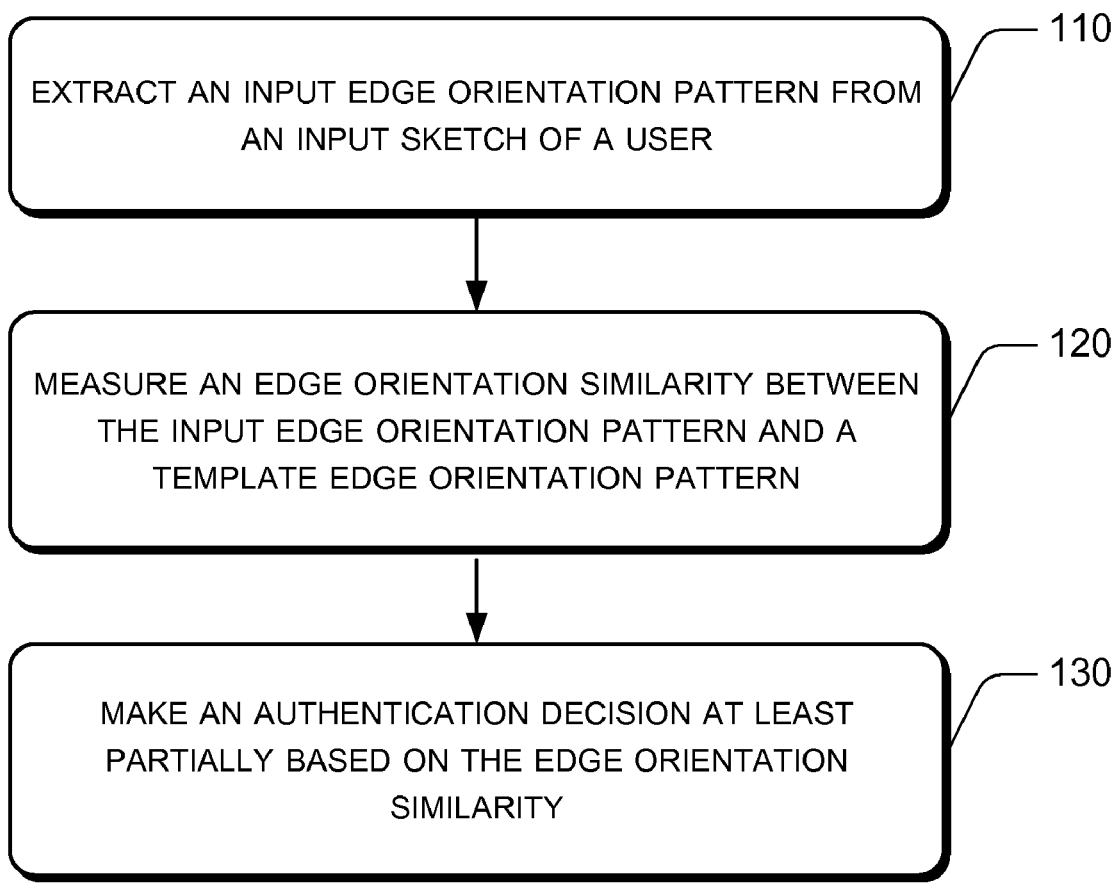
FIG. 1 is a flowchart showing the general aspects of an exemplary sketch-based password authentication process in accordance with the present disclosure.

Disclosed is a drawmetric password authentication system, called "Scribble-a-Secret" as it is based on user sketches. The scheme takes advantage of the high retention of graphical passwords, but does not require users to input graphical passwords in a particular sequence of strokes and allows for a modicum of variation when recreating their passwords, thus making the authentication process more user-friendly.

The disclosed authentication scheme uses free form drawings or sketches as a means to authenticate users. Users can draw any sketch he or she desires as a password. The sketch can be a graphic pattern, alphanumeric handwriting, or a combination of both. The system does not authenticate users based on the exact matching of drawings as in the Draw-a-Secret (DAS) system or text-based authentication system, instead it authenticates based on the future similarity between an edge orientation pattern extracted from the sketch the user enters and an edge orientation pattern extract from the user's pre-registered template sketch. The feature similarity is based on edge orientation patterns extracted from digitized images of the sketches, leading to a more flexible and robust authentication system. The system or the user can adjust how closely the sketch should match the pre-registered one, thus increasing the security of the system, or relaxing the security by allowing more deviation from the pre-registered sketch. This new password scheme can be deployed for any user authentication, and is particularly suited for protecting information on devices such as the PDA, Tablet PC, and game devices such Nintendo-DS, where the stylus is a major input means.

To increase the robustness of the recognition technique, the authentication system provides a technique that handles the distortions of the sketch caused by the user's inability to perfectly recreate their passwords. At the same time the system is able to distinguish the user password from other users' passwords without rejecting the user's own password.

The authentication system disclosed herein uses an image-based recognition approach to symbol recognition, where the task is to recognize individual hand-drawn figures such as geometric shapes, graphs and symbols. The approach has a number of desirable characteristics. First, the system does not require a process of decomposing a sketch into primitives such as lines and curves, called segmentation. Many of the traditional recognition approaches such as graph-based methods rely on the segmentation, making them vulnerable to segmentation errors. Second, the image-based approach does not pose difficulty for multiple pen strokes or different drawing orders. Many of the traditional approaches have either relied on single stroke methods in which an entire symbol must be drawn in a single pen stroke, or in the correct order to be considered a match. Lastly, because of its freedom from segmentation, the image-based recognition provides great simplicity and flexibility in adding new patterns to the system. In the disclosed system, for example, a new sketch password can be easily added to the database by simply drawing a single example of it. Moreover, the method has the potential to provide a more robust recognition as more examples of sketches are provided.

In the disclosed Scribble-A-Secret authentication scheme, empirical data is used to determine what sketch passwords are more secure or less secure than others if such distinction is not immediately clear. Empirical data may be useful for the system to provide users with the guidelines to select a secure sketch password. This is different from the traditional exact-matching authentication schemes, for example text-based password systems, in which the secureness of the selected password can be straightforwardly measured by the number of alphanumerics used and/or the randomness of the alphanumerics.

The Scribble-A-Secret authentication scheme uses a threshold to distinguish a sketch password of the legitimate user from others. When a similarity between the sketch and the pre-registered sketch is higher than the given threshold, the sketch is accepted, or otherwise rejected. If the legitimate user's sketch is rejected, it causes a false rejection, whereas if the non legitimate user's sketch is accepted, it causes a false acceptance. Setting an appropriate threshold thus may involve a trade-off of secureness and usability, that is, setting a higher threshold makes the system more secure, but decreases the usability as it is more likely to cause false rejections, and vice versa. An appropriate threshold may differ from sketch to sketch. In some embodiments, the authentication scheme therefore includes a method to estimate an appropriate threshold for each sketch that minimizes the number of false rejections while maintaining the secureness as much as possible.

The sketch-based authentication is described with reference to the accompanying figures below. The order in which a process is described is not intended to be construed as a limitation, and any number of the described method blocks may be combined in any order to implement the method, or an alternate method.

FIG. 1 is a flowchart showing the general aspects of an exemplary sketch-based password authentication process in accordance with the present disclosure. The sketch-based password authentication process may be used for authenticating a user logon to a computing device, such as a PC or portable electronic device, or an online account hosted on a server. The authentication system used for performing the authentication process may reside in the computing device, which may either be a local device or a remote device such as a server.

At block 110, the authentication system extracts an input edge orientation pattern from an input sketch of a user needing authentication. When used for user logon, the input sketch serves as a sketch-based password for logon. As will be further illustrated in later sections of the present description, to extract the input edge orientation pattern, the authentication system may extract a set of quantized orientation patterns. Each quantized orientation pattern may have a scalar pattern of one of R quantized orientations, where $R \geq 2$ is an integer. R can be optimized for a balance between minimizing false acceptance rate and minimizing false rejection rate of authentication.

In some embodiments, to extract the input edge orientation pattern, the authentication system first obtains a preliminary orientation pattern of a first dimension (e.g., M×M), derives a reduced orientation pattern by reducing the preliminary orientation pattern from the first dimension to a second dimension (e.g., N×N, where N<M), and then computes the input edge orientation pattern from the reduced orientation pattern. As will be further described later, the second dimension can be optimized for a balance between minimizing false acceptance rate and minimizing false rejection rate of authentication.

One way to extract the input edge orientation pattern from the input sketch is to compute a gradient orientation of image intensity in the input sketch; quantize the gradient orientation to rth orientation out of R quantized orientations, where r=1, 2, ..., R; and compute the input edge orientation pattern from the quantized gradient orientation. This exemplary technique is described further in later sections of this description.

At block 120, the authentication system measures an edge orientation similarity between the input edge orientation pattern and a template edge orientation pattern. The template edge orientation pattern may be extracted from one or more initial sketches of the user. As will be further illustrated in later sections of this description, in some embodiments the template edge orientation pattern includes a set of quantized orientation patterns. Each quantized orientation pattern may have a scalar pattern of one of R quantized orientations. Each pixel of the scalar pattern has an amplitude value, and is identified with one of the R quantized orientations.

The template edge orientation pattern may be extracted from multiple sketches entered by the user to achieve better results. In one exemplary embodiment, the authentication system updates the template edge orientation pattern using the input sketch of the user, either by substituting the existing template edge orientation pattern by a new template edge orientation pattern extracted from the input sketch, or by computing a new template edge orientation pattern extracted from both the initial sketch(es) and the new input sketch.

At block 130, the authentication system makes an authentication decision at least partially based on the edge orientation similarity. For example, the authentication system may use a preset threshold for edge orientation similarity. If the measured edge orientation similarity between the input edge orientation pattern and the template edge orientation pattern of the user is at or above the threshold, the authentication system accepts the user; otherwise, the authentication system rejects the user. In some embodiments, the authentication may be based only partially on the edge orientation similarity. For example, the sketch-based password may be combined with another form of password (e.g., text-based password), either jointly or alternatively, in a dual password application. Using dual passwords jointly increases security by requiring authentication of both passwords, while using dual password alternatively increases flexibility by allowing the user to logon with either of the two passwords. In situations where flexibility and convenience is more desired than heightened security (for example, personal portable devices), the alternate dual password application may be helpful.

Figure 2:
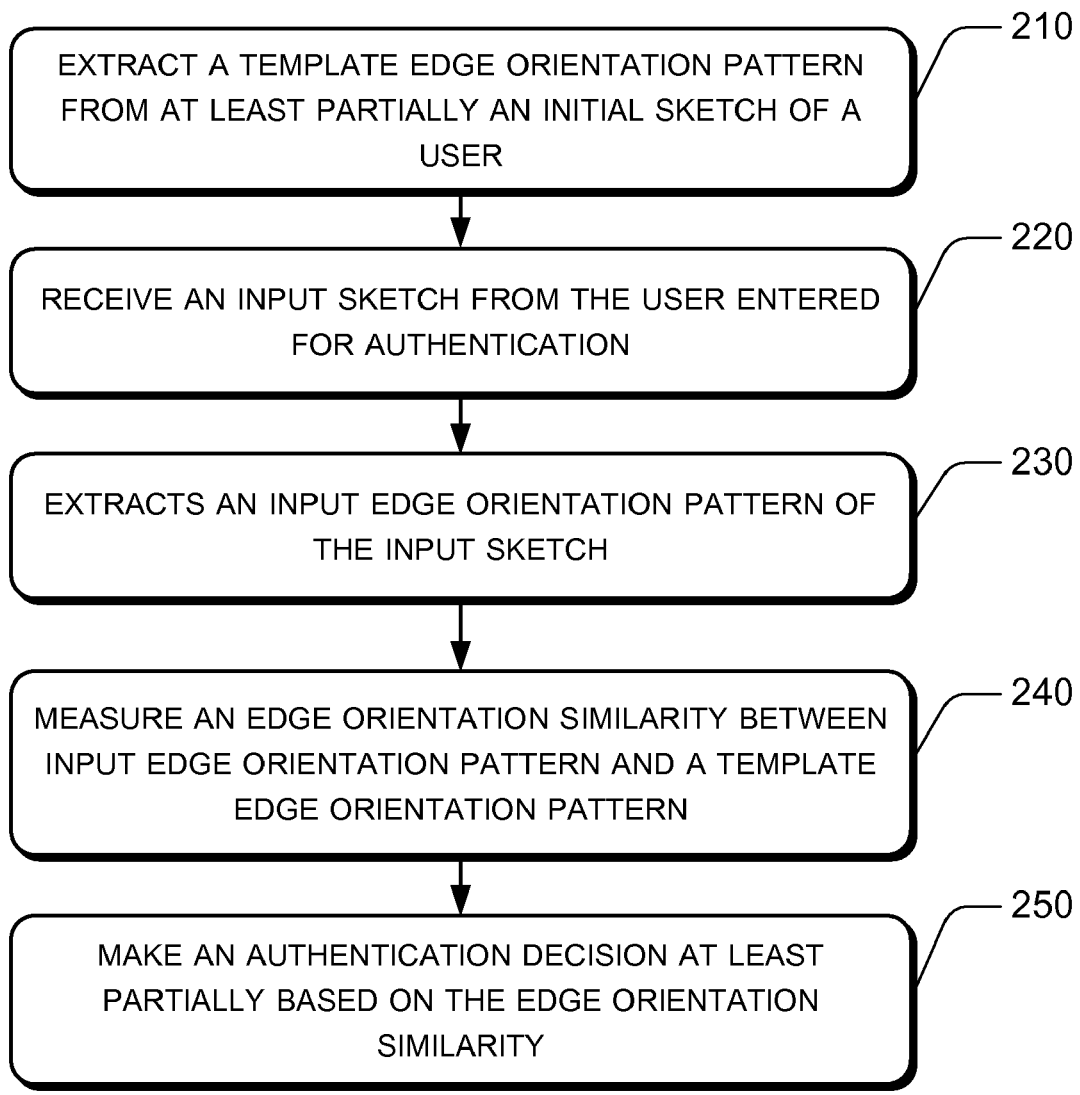
FIG. 2 is a flowchart of another exemplary embodiment of the sketch-based password authentication process in accordance with the present disclosure.

FIG. 2 is a flowchart of another exemplary embodiment of the sketch-based password authentication process in accordance with the present disclosure.

At block 210, the authentication system extracts a template edge orientation pattern from at least partially an initial sketch of a user. The template edge orientation pattern may be extracted from either a single initial sketch or multiple initial sketches. When multiple initial sketches are used, the template edge orientation pattern may reflect the average features of the multiple initial sketches.

In some embodiments, the template edge orientation pattern has a first set of quantized orientation patterns, and the input edge orientation pattern has a second set of quantized orientation patterns. Each quantized orientation pattern has a scalar pattern of one of a plurality of quantized orientations. Each pixel of the scalar pattern has an amplitude value.

To extract the template edge orientation pattern, in some embodiments the authentication system may first compute a gradient orientation of image intensity in the initial sketch and quantize the gradient orientation to rth orientation out of R number of quantized orientations, where r=1, 2, ..., R. The authentication system then obtains a preliminary orientation pattern using the quantized gradient orientation, further obtains a reduced orientation pattern by reducing the preliminary orientation pattern from a first dimension (e.g., M×M) to a second dimension (e.g., N×N, where N<M), and finally computes the template edge orientation pattern from the reduced orientation pattern.

At block 220, the authentication system receives an input sketch from the user entered for authentication. In a user logon situation, for example, the received input sketch serves as a sketch-based password to be authenticated by the authentication system.

At block 230, the authentication system extracts an input edge orientation pattern of the input sketch. Exemplary processes of extracting an input edge orientation pattern of the input sketch are similar to that in FIG. 1, and will be further described later in this description. For example, in order to extract the input edge orientation pattern, the authentication system may first compute a gradient orientation of image intensity in the input sketch; quantize the gradient orientation to rth orientation out of R number of quantized orientations, where r=1, 2, ..., R; and then compute the input edge orientation pattern using the quantized gradient orientation.

At block 240, the authentication system measures an edge orientation similarity between the input edge orientation pattern and the template edge orientation pattern.

At block 250, the authentication system makes an authentication decision at least partially based on the edge orientation similarity.

In some embodiments, the authentication system may estimate the false acceptance rate and the false rejection rate of the template edge orientation pattern based on the initial sketch of the user, and suggest an alternative initial sketch if the estimated false acceptance rate and false rejection rate is unsatisfactory according to a predefined standard. For example, if the false acceptance rate is too high, the initial sketch used for extracting the template edge orientation pattern may be too simplistic. The authentication system may thus suggest a more sophisticated sketch (e.g., a sketch with more strokes or a more complicated shape) to the user to decrease the false acceptance rate. Reversely, if the false rejection rate is too high, the initial sketch used for extracting the template edge orientation pattern may be too complicated. The authentication system may accordingly suggest a less complicated sketch to the user to decrease the false rejection rate.

Figure 3:
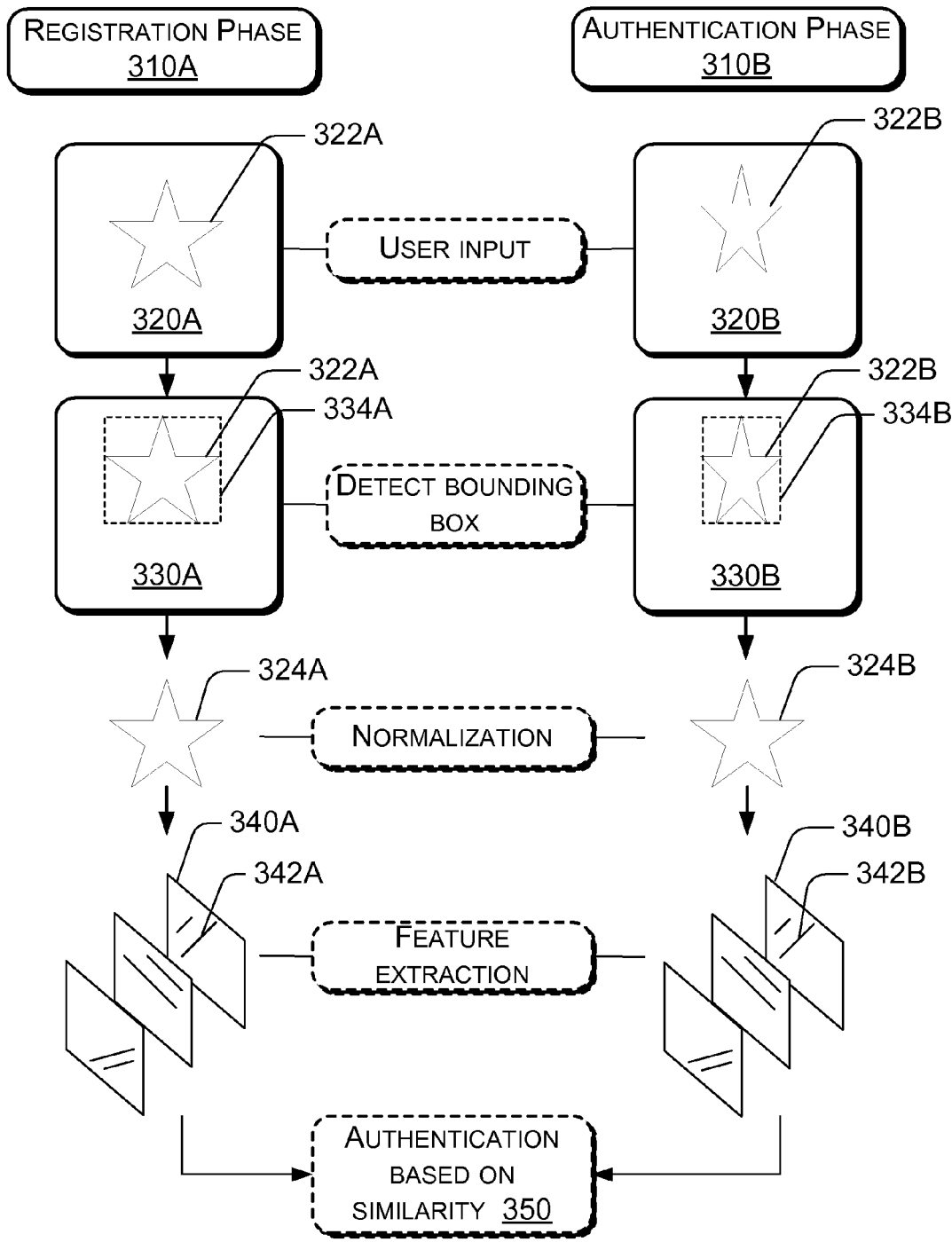
FIG. 3 is a flowchart of an exemplary process of the sketch-based password authentication including both a registration phase and an authentication phase.

FIG. 3 is a flowchart of an exemplary process of the sketch-based password authentication including both a registration phase and an authentication phase.

At registration phase 310A, user is asked to provide a sample sketch password as initial sketch 322A, which can be used as a template. Correspondingly, at authentication phase 310B (the actual application phase), user is asked to redraw the sketch as an input sketch 322B. At both registration phase 310A and authentication phase 310B, the sketch (322A and 322B, respectively) is stored as an image. The authentication system detects the surrounding rectangle (334A or 334B) of the image and normalizes it to a normalized image (324A or 324B) having the size of M×M. The normalization is done to absorb the deformation of scaling a sketch.

In one example, each sketch is normalized to the size of 128×128 (M=128). The edge features are extracted from the normalized images (324A and 324B) and compared using a similarity function to obtain a similarity score. Exemplary similarity functions will be discussed later in this description. Exemplary edge features include edge orientation patterns 340A and 340B each having a pattern of one of the quantized orientations (342A and 342B).

Finally, authentication is performed at block 350 by comparing the similarity score to a user-defined threshold. If the score is higher than the threshold, the user is accepted or otherwise rejected.

Further detail of exemplary embodiments of the above described sketch-based authentication system and method is described as follows.

Extraction of Edge Orientation Patterns

Instead of using pattern recognition based on direct comparisons of an input drawing with a template, one exemplary embodiment of the present sketch-based authentication compares feature patterns extracted the user input image and the template.

The presently disclosed sketch authentication technique may use the most promising representation of edge orientation called orientation pattern in the sketch-based password authentication system. The edge features have been used in optical character recognition (OCR) techniques and found to give the highest recognition rate in the history of OCR. The effectiveness of the usage of orientations of edges can be explained by the studies from neurophysiology, where edge orientation is were found to be the most dominant in recognizing shapes of objects.

Figure 4:
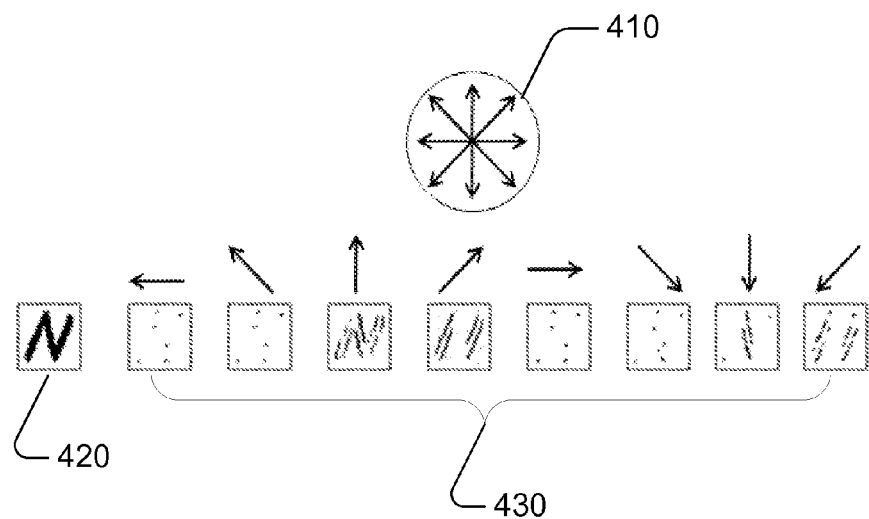
FIG. 4 illustrates exemplary edge orientation features extracted from a 2-D array of pixels.

FIG. 4 illustrates exemplary edge orientation features extracted from a 2-D array of pixels. Eight different directions 410 are used as elemental directions. An input image 420 is decomposed into eight orientation patterns 430, each representing an edge orientation feature corresponding to one of the eight directions 410. In each orientation pattern 430, each pixel has an image density measured by an amplitude value representing how much the input image is characterized by the corresponding orientation at that pixel. For example, a pixel with zero image density in a particular orientation pattern corresponds to a pixel position at which the input image 420 has no element of that orientation. A pixel with a high image density (represented by a black dot) of the orientation pattern corresponds to a pixel position at which the input image 420 has a distinctive element of that orientation.

The authentication is processed based on the similarity between the user's sketch input and his template registered in the database. The orientation patterns 430 are used as expected features of sketches to measure the similarity between two given sketches. The overall procedure of sketch-based authentication using orientation patterns extracted from an image is illustrated in FIG. 3.

Figure 5:
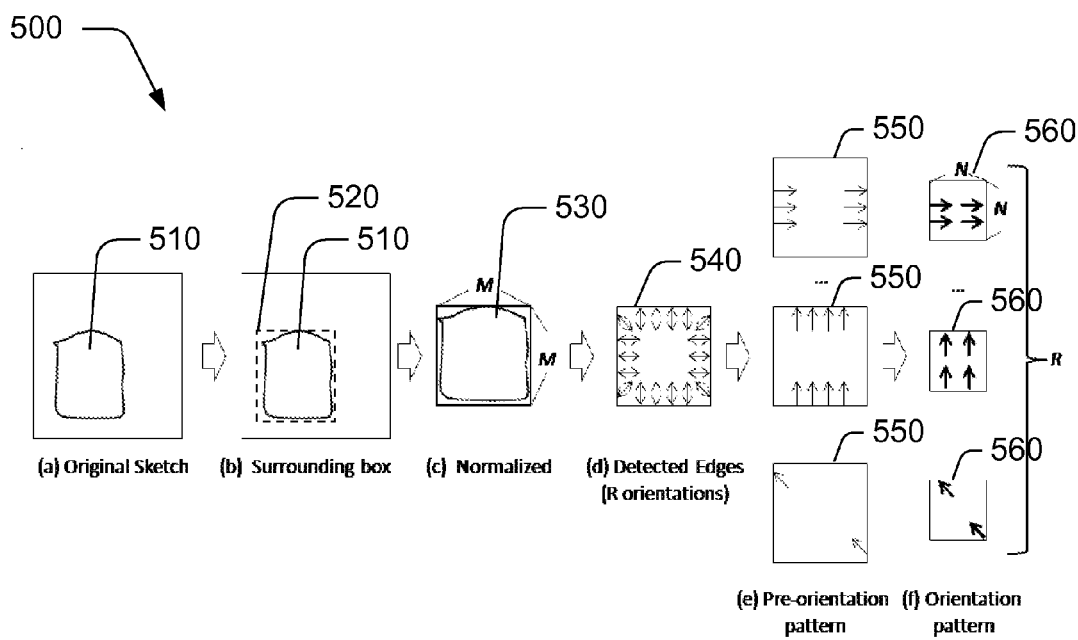
FIG. 5 illustrates an exemplary process of extracting edge orientation patterns.

FIG. 5 illustrates an exemplary process of extracting edge orientation patterns. The extraction process 500 can be used for extracting edge orientation patterns from either a template sketch (e.g. 322A) entered in registration phase or an input sketch (e.g., 322B) entered in an authentication phase.

Given a sketch 510 as an image A=a(i, j), a surrounding rectangle 520 of the drawn image is first detected and normalized to the size of M×M accordingly. The normalization results in a normalized sketch 530. The normalization process is done to absorb the deformation of scaling of a sketch. Next, given the normalized sketch 530, edge orientations 540 of the sketch are extracted using an edge detection filter, for example a Sobel filter. The Sobel filter calculates the gradient of the image intensity as each pixel point a(i, j), giving the direction of the largest possible increase from light to dark and the rate of change in that direction. Mathematically, the Sobel filter uses two 3×3 kernels which are convolved with the original image A to calculate gradient approximations (or approximations of the derivatives), one for horizontal changes, and one for vertical. Let $G_x$ and $G_y$ represent these horizontal and vertical gradient approximations, they are computed as:

$$G_x = \begin{pmatrix} -1 & 0 & 1 \\ -2 & 0 & 2 \\ -1 & 0 & 1 \end{pmatrix} * A; \text{ and} \quad (1a)$$

$$G_x = \begin{pmatrix} 1 & 2 & 1 \\ 0 & 0 & 0 \\ -1 & 2 & -1 \end{pmatrix} * A.$$

$$G_x(i,j) = a(i+1, j-1) + 2a(i+1, j) + a(i+1, j+1) - \quad (1b)$$
$$(a(i-1, j-1) + 2a(i-1, j) + a(i-1, j+1))$$
$$G_y(i,j) = a(i-1, j-1) + 2a(i, j-1) + a(i+1, j-1) -$$
$$(a(i-1, j+1) + 2a(i, j+1) + a(i+1, j+1))$$

At each pixel point in the image a(i, j), the resulting gradient approximations can be combined to give the gradient magnitude g(i, j) by:

$$g(i,j) = \sqrt{G_x(i,j)^2 + G_y(i,j)^2}. \quad (1)$$

The gradient's orientation θ(i, j) of each pixel can also be calculated using the gradient approximations:

$$\theta(i,j) = \arctan\{G_y(i,j)/G_x(i,j)\} \quad (2)$$

The gradient's orientation θ(i,j) is calculated for each pixel a(i, j), and is then quantized to the rth orientation out of R number of orientations. The quantized value of θ(i,j) is denoted as Θ(i,j), which is assigned an integral value R to identify with the rth orientation (r=1, 2, ..., R). Under this scheme, Θ(i,j)=R when the gradient's orientation θ(i,j) is most closely approximated by the rth quantized orientation. Accordingly, a scalar value of the gradient magnitude is assigned:

$$p_r(i,j) = g(i,j)\delta(r - \Theta(i,j)), \text{ for } r=1,2,\ldots,R, (i,j) \in M \times M, \quad (3)$$

where $p_r(i,j)$ is the scalar value of the gradient magnitude at pixel a(i, j), Θ(i,j) denotes the quantized value of θ(i,j), and δ(x) equals to 1 when x=0 and 0 otherwise.

Therefore, $p_r(i,j) = g(i,j)$ and $p_{s \neq r}(i)j) = 0$ if the gradient's orientation of the pixel a(i, j) is quantized to be the rth quantized orientation. Thus $p_r(i,j)$ represents an orientation pattern having R sub-patterns (e.g., 550) each for one of the R quantized orientations (e.g., 540).

In one embodiment, $p_r(i,j)$ obtained above only represents a preliminary orientation pattern (or pre-orientation pattern), from which the final orientation pattern is further derived. For example, to obtain the orientation pattern 560 from the pre-orientation pattern 550, the dimension is reduced from M×M to N×N by blurring. The pixels of resultant orientation patterns 560 are denoted as $o_r(i,j)$ which is computed as follows.

$$o_r(k, l) = \frac{1}{h^2} \sum_{a=-\frac{1}{2}h}^{\frac{1}{2}h} \sum_{b=-\frac{1}{2}h}^{\frac{1}{2}h} p_r(X, Y) \quad (4)$$

$$X = hk - \frac{1}{2}h + a$$

$$Y = hl - \frac{1}{2}h + b,$$

where h=M/N. Note that the dimension reduction rate is $h^2$. The resulting orientation patterns 560 have pixels $$\{o_r(i,j) | r=1,2,\ldots,R, (i,j) \in N \times N\}. \quad (5)$$

The resultant orientation patterns 560 correspond to a sketch image that is normalized, decomposed, and reduced in size, to be used for comparison of edge orientation patterns in authentication. The process illustrated above with reference to FIG. 5 can be applied to any sketch 510, whether an initial sketch entered in registration phase or an input sketch entered in authentication phase, and the resultant orientation patterns 560 are used for pattern similarity comparison in authentication, as further illustrated below.

Similarity Measurement

The authentication is processed based on the similarity between user's input sketch and his registered initial sketch which is referred to as a template. The template is conceded the "correct" sketch against which an input sketch is evaluated for authentication. The similarity between two given sketches is used to distinguish a legitimate user from others.

Given orientation patterns of two sketches A and B denoted as $$O_A = \{o_r^A | r=1,2,\ldots R, (i,j) \in N \times N\}$$

and $$O_B = \{o_r^B | r=1,2,\ldots ,R, (i,j) \in N \times N\}, \quad (6)$$

respectively, their similarity $S(O_A, O_B)$ can be computed using the correlation coefficient as follows.

$$S(O_A, O_B) = \frac{<o_A, o_B>}{\|o_A\|\|o_B\|}, \quad (7)$$

where $<X,Y>$ denotes an inner product of X and Y. The computed correlation coefficient is used, with reference to an acceptance threshold $\epsilon$, to distinguish whether or not the input was made by a legitimate user.

Optimization of Parameters

In order to have robust authentication, optimal parameters of R and N for the orientation pattern may be assessed and used so that the process best captures the characteristic features suitable for the sketch-based password authentications. The optimization may be empirical. For example, the assessment of the authentication robustness or accuracy can be measured by using the false acceptance rates (FAR) and false rejection rates (FRR). When the acceptance threshold $\epsilon$ is high, the FRR becomes lower but FAR may become higher, and vice-versa. This relationship can be depicted on a receiver operating characteristic curve (called an ROC curve), where percentage of FAR and FRR are shown on x- and y-axes of an ROC curve, respectively. Any decrease in FAR is usually accompanied by an increase in FRR. The closer the curve follows the left-hand border and the bottom border of the ROC space, the better the results are, since this pattern indicates low FAR and, correspondingly, low FRR. Given a ROC curve, one may use the area under ROC curve, which is denoted as AUROC, to compare among different ROC curves. An AUROC value of 0 represents a perfect authentication and an AUROC value of 0.5 represents a worthless authentication.

For example, using the ROC curve as an assessment tool to find the optimal parameters for R and N, a function J(R, N) is defined which measures the authentication accuracy in terms of the area under ROC curve given a certain R and N:

$$J(R,N) = \int_{\epsilon=0}^{\epsilon=1} G(FAR(R,N,\epsilon)) H(FAR(R,N,\epsilon)) d\epsilon, \quad (8)$$

where $$H(FAR(R,N,\epsilon)) = (d(FAR(R,N,\epsilon))/d\epsilon) \quad (9)$$

and $\epsilon$ denotes the threshold of the similarity score ranging from 0 to 1 and $FRR(R,N,\epsilon) = G(FAR(N,R,\epsilon))$ denotes the FRR in function of FAR.

The J(R,N) that has the minimum value defines the best parameters for R and N. The J(R,N) of 0 represents the perfect authentication, while the J(R,N) of 0.5 represents a worthless authentication since this would equal to randomly deciding whether the input is the legitimate user or not. The best parameters for R and N can be obtained through experiments. In one example, R=8 and N=8.

In addition, the number of strokes of the registered sketch also has an impact on the robustness of authentication, and may be considered as part of optimization or recommendation. In some experiments, it has been observed that the best performance is obtained when 7 to 9 strokes are used to draw the sketch with an AUROC value of 0.05. It has also been observed that the authentication accuracy may deteriorate when more than 10 strokes were used to draw the sketch, possibly due to the user difficulty of creating a complex sketch accurately resulting in large deviations in the sketches.

Therefore, the authentication system may use the number of strokes of a sketch as an indicator, in addition to other factors, to determine the secureness of the sketch. For example, the system may encourage, recommend or require the user to use a few strokes for his or her sketch password if it has determined that too many strokes are being used to negatively impact the effectiveness of the password.

Another factor that may have an impact on the secureness of the sketch is the complexity of the sketches used as passwords. Experiments suggest that a complex sketch is generally more likely to result in a more accurate authentication rate. However, there were exceptions. For example, a complex sketch may not be a good password when the sketch contains certain shapes, such as a circle, that have a tendency to create large variations when drawing. These variations may be due to the difficulty of drawing these shapes constantly, although these variations can be at least partially absorbed by using a template created based on multiple samples.

Accordingly, the authentication system may suggest users to select a sketch that is relatively complex, but at the same time is easy for to draw constantly. One way to measure the complexity of the sketch to use a spatial distribution score.

Estimating an Appropriate Threshold

Setting an appropriate threshold $\epsilon$ for password acceptance is an important issue for the practical usage of the system. The sketch-based authentication system may either set a global threshold for all users, or preferably set customized threshold for each user based on the characteristics of the sketch provided by the user and other factors such as user preference and user history. It has been observed that using a customized threshold for each user increases the authentication accuracy over the results using a single global threshold for all users. Setting a higher threshold makes the system more secure, but decreases the usability as it is more like to cause false rejections, and vice versa. The present disclosure proposes a method to estimate an appropriate threshold for each sketch that minimizes the number of false rejections while maintaining the security of the system as much as possible, as discussed below.

One exemplary embodiment of the authentication system defines an appropriate threshold for each user to be the value that gives the lowest value of FRR with the 0% of FAR. In this definition, the threshold would be set so that the acceptance of sketches by a legitimate user is maximized while the acceptance of sketches by a non legitimate user is minimized. If the appropriate threshold thus defined can be estimated, the system or the user can use it as a baseline to adjust the threshold according to the user need. Setting a lower threshold than the estimated value would loosen the security and increase the usability by allowing more distorted sketches, and vice versa.

To estimate an appropriate threshold $\epsilon_U$ of the user U, one may use average complexity scores of the other users as training data. In one example, the threshold of the user whose complexity is closest to the user U can be used as the user U's threshold:

$$\epsilon_U = \underset{\epsilon}{\operatorname{argmin}} F(U, (O, \epsilon)), \quad (11)$$

where a function $F(U,(O,\epsilon))$ denotes the similarity score of complexity between sketches drawn by the user U and the user O. The similarity score of complexity is defined by the absolute difference between spatial distribution scores of the two sketches. It is observed that using the above estimated appropriate thresholds resulted in an improvement in authentication accuracy (i.e., lower the FRR value and the FAR value), although the results are not as good as the results when the actual best threshold is used.

Memorability

The memorability of the password is another important property to be considered as it is one of the strong motivations to use the graphical authentication password. The authentication system may evaluate the memorability of a sketch-based password and provide a feedback to the user, in the form of a comment or warning. The retention tests of the memorability of sketch-based passwords have indicated that the memorability of sketch-based passwords is generally high. However, there is evidence that a sketch-based password having alphanumerical symbols in the sketches tend to have lower memorability. This result can be a basis for the authentication system to encourage users to pick passwords other than alphanumerical symbols.

Template Creation Using Multiple Samples

While a single sample of a sketch may offer a robust template, using multiple samples to train the template may make the system more robust, depending on the complexity of the sketches as well as the individual user's ability and condition of drawing sketches. Many approaches that are built on statistical learning methods may be used for creating a template user multiple samples. Some statistical learning methods, such as those that use a neural network recognizer, may require large amounts of training data. Although these methods may provide a good result, they are not easily extensible when new sketches are added to the system.

Described in the following is a simple and fast creation of templates based on multiple samples created by averaging each edge orientation patterns:

$$\hat{o}_r(k, l) = \frac{1}{m} \sum_{s=1}^{m} o_r^s(k, l), \quad (11)$$

where $o_r^s(k,l)$ denotes the sth sketch drawn by a user and supplied as a sample for training a template. $\hat{o}_r(k,l)$ is the average orientation pattern of the template to be created. It has been observed that a template created by multiple samples significantly improves the robustness of the authentication. In some experiments, it has been observed that although the authentication accuracy improves as more sketches are used to create the template, the best performance can be achieved or approximated when only a limited number of samples (e.g., nine) are used. The increase in the accuracy is more significant for sketches with just a few strokes.

Accordingly, the authentication system may either require or encourage the user to provide multiple samples to create the template to increase the security as well as robustness of the authentication as discussed below. The multiple samples may be entered into in a single registration session, or in multiple occasions. For example, the user may initially provide one or more samples to a registration. If the system determines that the resulting sketch-based password has sufficient robustness, the template may be accepted and kept for any future use. But if subsequently the authentication system has detected, for example based on the actual usage by the user, that the sketch-based password is inadequate, the system may require the user to either provide a new sketch-based password, or to provide additional samples of the same password improve its robustness. Alternatively or additionally, the authentication system may collect input sketches entered by the user is subsequent uses and dynamically update the template.

Implementation Environment

The above-described authentication method may be deployed on any computing device or computer system that requires authentication for user access such as user logon. Examples of such a computing device or system include a personal computer (PC) such as a tablet PC, a portable device such as a PDA, a game device such as a game console, and a server.

Figure 6:
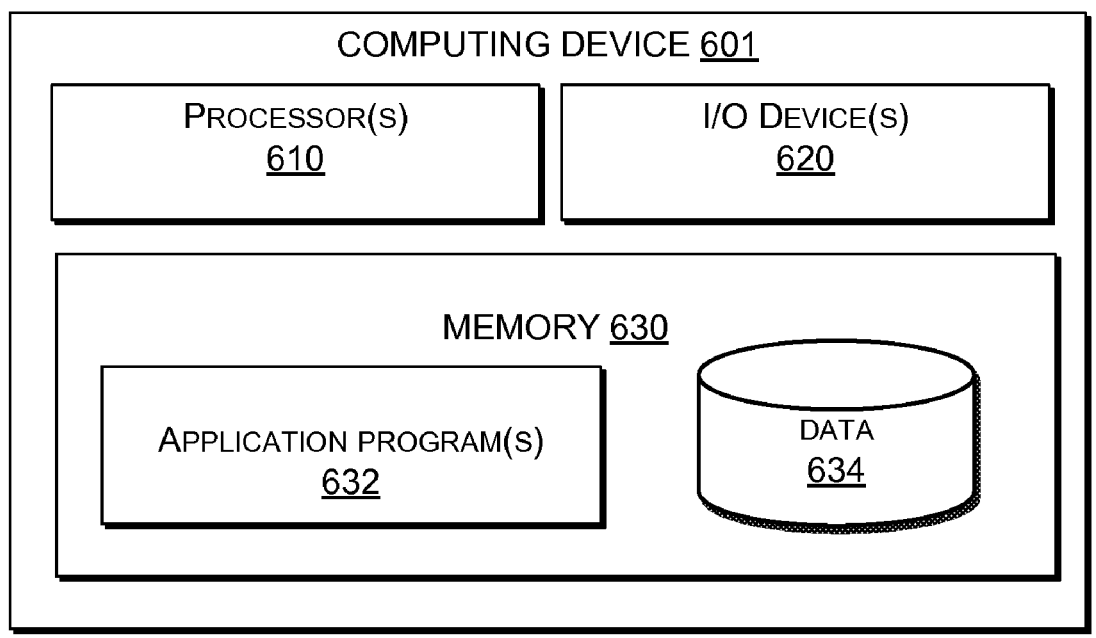
FIG. 6 shows an exemplary environment for implementing the authentication method of the present disclosure.

FIG. 6 shows an exemplary environment for implementing the authentication method of the present disclosure. The authentication method is implemented in computing device 601 which includes processor(s) 610, I/O devices 620, computer readable media (e.g., memory) 630, and network interface (not shown). The computer device 601 may be standalone device or connected to a network (not shown).

The computer readable media 630 stores application program modules 632 and data 634 (such as sketch image data). Application program modules 632 contain instructions which, when executed by processor(s) 610, cause the processor(s) 610 to perform actions of a process described herein (e.g., the processes of FIGS. 1-3).

For example, in one embodiment, computer readable medium 630 has stored thereupon a plurality of instructions that, when executed by one or more processors 610, causes the processor(s) 610 to:

(1) extract an input edge orientation pattern from an input sketch of a user;

(2) measure an edge orientation similarity between input edge orientation pattern and a template edge orientation pattern; and (3) make an authentication decision at least partially based on the edge orientation similarity.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

Figure 7:
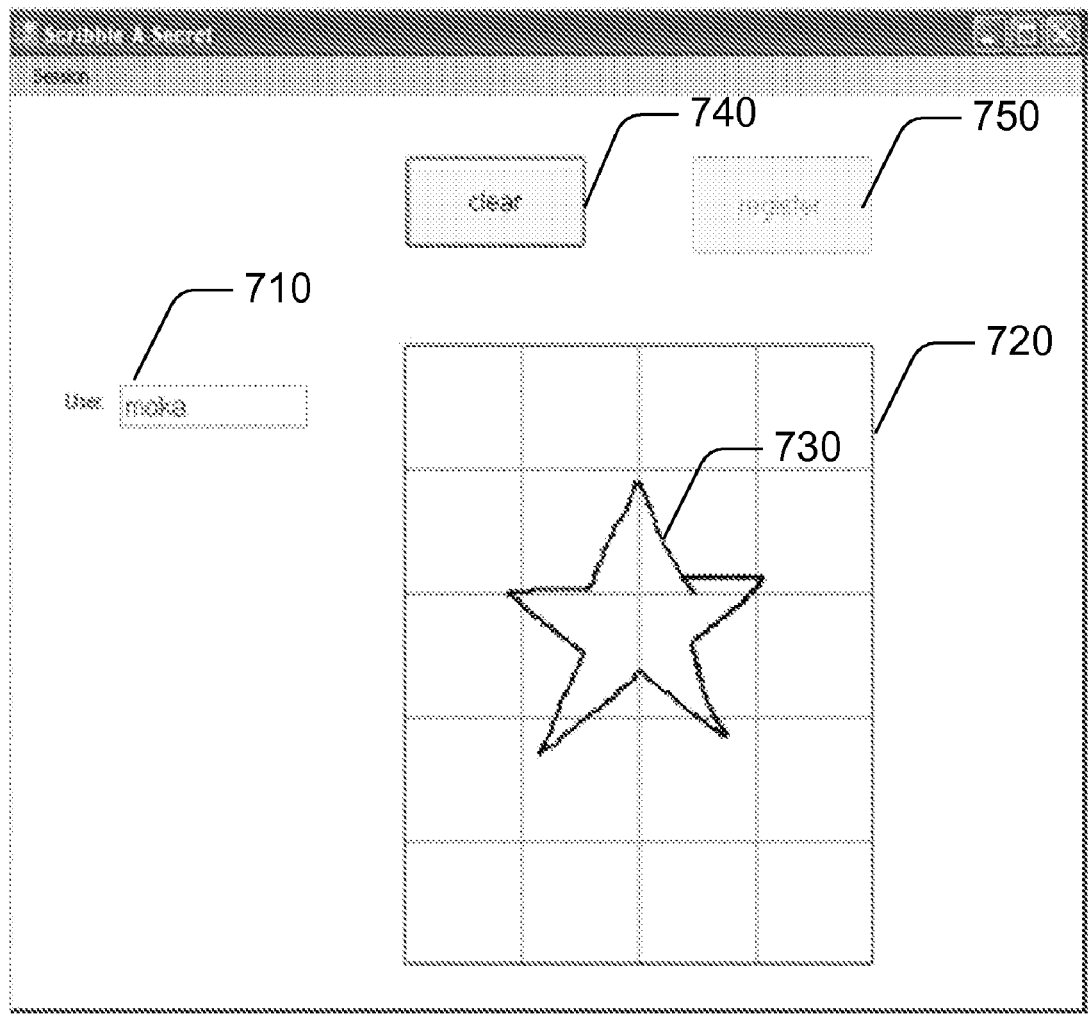
FIG. 7 shows an exemplary user interface used in the sketch-based authentication.

In general, to deploy the sketch-based authentication method, the system should preferably have a graphical interface used to collect the sketches input by the user. FIG. 7 shows an exemplary user interface used in the sketch-based authentication. Area 710 is for the user to enter a user name. Area 720 is for the user to enter a sketch-based password 730. Area 720 may be a part of an interactive screen such as a touch sensitive screen on which the user may draw the sketch-based password 730 using an input device such as a stylus. Button 740 is used for clearing an unwanted sketch, while button 750 is used for registering the sketch-based password 730 (either in registration phase or authentication phase).

CONCLUSION

A sketch-based authentication system called Scribble-a-Secret that measures similarity of sketches to authenticate a user has been described. The authentication system allows for a modicum of variation when users recreate their passwords. The system uses a robust image-based approach using edge orientation patterns to handle different stroke order as well as number of strokes. A simple and fast similarity measurement and template making method may be used to allow users to easily add new sketches. The authentication system has a potential benefit of having high memorability of the sketch-based password by the user.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for authentication, comprising:
   extracting a preliminary edge orientation pattern that fits in a first dimension from an input sketch of a user, the preliminary edge orientation pattern including a set of quantized orientation patterns;
   obtaining an input edge orientation pattern by scaling the preliminary orientation pattern that fits in the first dimension to fit into a second dimension that is smaller than the first dimension by blurring, the scaling reducing a corresponding size of each quantized orientation pattern;
   measuring an edge orientation similarity between the input edge orientation pattern and a template edge orientation pattern; and
   making an authentication decision at least partially based on the edge orientation similarity,
   wherein a size of the second dimension is selected to achieve a desired balance between a false acceptance rate and a false rejection rate of authentication, and wherein extracting the preliminary edge orientation pattern comprises:
   computing a gradient orientation of image intensity in the input sketch;
   quantizing the gradient orientation to each r th orientation of R number of quantized orientations, where r=1, 2, . . . , R; and computing the preliminary edge orientation pattern from the quantized gradient orientation.

2. The method as recited in claim 1, wherein the template edge orientation pattern is extracted from at least one initial sketch of the user.

3. The method as recited in claim 1, wherein the template edge orientation pattern includes a set of quantized orientation patterns.

4. The method as recited in claim 3, wherein each quantized orientation pattern comprises a scalar pattern of one of a plurality of quantized orientations that includes one or more pixels, each pixel of the scalar pattern having an amplitude value.

5. The method as cited in claim 1, wherein a quantity of the quantized orientation patterns in the set corresponds to a number of quantized orientations.

6. The method as recited in claim 1, wherein each quantized orientation pattern is a scalar pattern for one of R quantized orientations, where R≧2 is an integer.

7. The method as recited in claim 6, wherein R is selected to achieve a desired balance between a false acceptance rate and a false rejection rate of authentication.

8. The method as recited in claim 1, wherein a number of strokes in the input sketch is selected to achieve a desired balance between a false acceptance rate and a false rejection rate of authentication.

9. The method as recited in claim 1, wherein the template edge orientation pattern is extracted from a plurality of sketches entered by the user.

10. The method as recited in claim 1, further comprising updating the template edge orientation pattern based on the input sketch of the user.

11. The method as recited in claim 1, the method being implemented on a computing device for authenticating user logon.

12. A method for authentication, comprising:
    extracting a corresponding initial edge orientation pattern for each of multiple initial sketches of an image produced by user;
    averaging the initial edge orientation patterns to obtain a template edge orientation pattern;
    receiving an input sketch from the user entered for authentication;
    extracting an input edge orientation pattern of the input sketch;
    measuring an edge orientation similarity between input edge orientation pattern and a template edge orientation pattern;
    making an authentication decision at least partially based on the edge orientation similarity;
    estimating a false acceptance rate and false rejection rate of the template edge orientation pattern based on an initial sketch of the user; and
    suggesting an alternative image for obtaining at least on corresponding additional sketch from the user if the false acceptance rate and false rejection rate is unsatisfactory according to a predefined standard,
    wherein extracting the input edge orientation pattern comprises:
    computing a gradient orientation of image intensity in the input sketch; quantizing the gradient orientation to each r th orientation of R number of quantized orientations, where r=1,2, . . . , R; and
    computing the input edge orientation pattern using the quantized gradient orientation.

13. The method as recited in claim 12, wherein the template edge orientation pattern comprises a first set of quantized orientation patterns, and the input edge orientation pattern comprises a second set of quantized orientation patterns.

14. The method as recited in claim 13, wherein each quantized orientation pattern comprises a scalar pattern of one of a plurality of quantized orientations that includes one or more pixels, each pixel of the scalar pattern having an amplitude value.

15. The method as recited in claim 12, wherein extracting the input edge orientation pattern comprises:
   computing a gradient orientation of image intensity in the input sketch;
   quantizing the gradient orientation to r th orientation out of R number of quantized orientations, where r=1, 2, ..., R;
   obtaining a preliminary orientation pattern using the quantized gradient orientation;
   obtaining a reduced orientation pattern by reducing the preliminary orientation pattern from a first dimension to a second dimension; and
   computing the input edge orientation pattern from the reduced orientation pattern.

16. One or more computer readable media having stored thereupon a plurality of instructions that, when executed by a processor, causes the processor to:
   determine a number of quantized orientations for generating quantized orientation patterns that achieve a desired balance between a false acceptance rate and a false rejection rate for an input sketch-based user authentication;
   extract an input edge orientation pattern from an input sketch of a user, the input edge orientation pattern including a set of quantized orientation patterns that corresponds to the number of quantized orientations;
   measure an edge orientation similarity between input edge orientation pattern and a template edge orientation pattern having a set of template quantized orientation patterns that corresponds to the number of quantized orientations; and
   make an authentication decision at least partially based on the edge orientation similarity,
   wherein extracting the input edge orientation pattern comprises:
   computing a gradient orientation of image intensity in the input sketch; quantizing the gradient orientation to each r th orientation of R number of quantized orientations, where r=1,2, ..., R; and
   computing the input edge orientation pattern using the quantized gradient orientation.

* * * * *